March 14, 1972   F. G. DROUT   3,649,433
PARALLEL STRAND REINFORCED CELLULAR FLOOR COVERING
Filed July 9, 1970
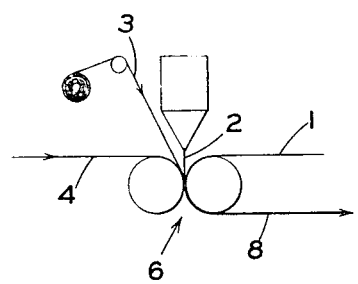
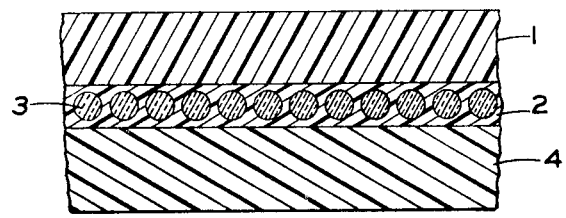
INVENTOR
FRANK G. DROUT
BY
ATTORNEY United States Patent Office 3,649,433
Patented Mar. 14, 1972

3,649,433
PARALLEL STRAND REINFORCED CELLULAR FLOOR COVERING
Frank G. Drout, Lancaster, Pa., assignor to Armstrong Cork Company, Lancaster, Pa.
Filed July 9, 1970, Ser. No. 53,416
Int. Cl. B32b 5/08, 5/18, 5/28, 27/12
U.S. Cl. 161—143
1 Claim

ABSTRACT OF THE DISCLOSURE

A floor structure is made with a vinyl wearing surface adhesively bonded to a foamed plastic backing. Between these two layers there is placed a reinforcing layer of parallel strands of glass fiber.

CROSS-REFERENCE TO RELATED APPLICATION

The invention herein is an improvement over the structure of application Ser. No. 497,737, filed Oct. 19, 1965, and issued on Dec. 26, 1967, as Patent No. 3,360,422.

BACKGROUND OF THE INVENTION

Field of the invention

The invention relates to a foamed floor covering consisting essentially of a poly(vinyl chloride) wearing surface, a cellular poly(vinyl chloride) backing and a reinforcing layer positioned between the two above layers.

Description of the prior art

U.S. Patent No. 3,002,868 discloses the first use of a cushioned floor product with a sheet of woven fabric positioned between a resilient backing and a wear-resistant facing. The glass fibers are utilized to prevent tearing of the flooring during handling and to avoid spreading of the floor covering once it is installed. The glass fibers are in the form of a tightly woven glass fiber scrim.

U.S. Pat. No. 3,360,422 is an improvement over the structure of the above patent. The structure of this patent utilizes an open-mesh glass fiber scrim which permits greater adhesion between the wear layer and foam backing.

The above floor structures are laid as sheets which are approximately 6 feet in width. When a plurality of sheets are laid side by side, the seams of the sheets must be bonded together to prevent their separation in use. Separation in use provides (1) an unsightly gap in the seam area, and (2) there is a tendency for the sheet material to curl and the edges to raise upward. This has been particularly noticeable when a woven scrim material is used. This type of structure provides strands which extend both across the sheet and longitudinally of the sheet. The absence of the strands across the sheet tends to eliminate the curl problem while the strands longitudinally of the sheet provide the necessary reinforcing.

SUMMARY OF THE INVENTION

The invention involves incorporation of parallel glass strands in the machine direction or longitudinally of the sheet flooring as a reinforcing media for the sheet flooring. The longitudinal direction or long dimension of the sheet is often called the machine direction because that is the direction the sheet moves through the producing machinery. Transverse of the sheet or along the narrow dimension of the sheet is often referred to as across the machine direction. The glass strands could be incorporated as part of the wear surface substrate, the foam backing or could be interposed between the wear layer and a foam backing when these two layers are laminated together. The function of the glass strand reinforcing is to maintain pattern repeat, to improve handling characteristics, and to improve puncture resistance of the wear surface of a foam-backed flooring without the undesirable across-machine direction curl, which is obtainable with the scrims or glass mats of the above-described patents. The floor structure is put together in the manner disclosed in the above-mentioned U.S. Pat. No. 3,360,422.

BRIEF DESCRIPTION OF THE DRAWING

FIG. I is a simplified diagrammatic representation of the method of forming the laminated product; and
FIG. II is an enlarged section, not to scale, of the final product.

DESCRIPTION OF THE PREFERRED EMBODIMENT

Referring to FIG. I, the wearing surface 1, the adhesive film 2, the fabric strands 3 and the foam backing 4 are all fed to the laminating rolls 6. The finished product 8 leaves the laminating rolls 6. The process used herein is basically the process set forth in U.S. Pat. No. 3,360,422.

Referring to FIG. II, the poly(vinyl chloride) wearing surface 1 and the cellular poly(vinyl chloride) backing 4 are bonded together by the adhesive film 2. The parallel strands of glass fiber 3 are shown between layers 1 and 4 in the area of the adhesive layer 2.

The poly(vinyl chloride) wearing layer may be prepared by any known methods, for example, according to the disclosure of U.S. Pat. Nos. 3,000,754, 3,056,224, and 3,115,386. The wear layer is the same as the wear layer set forth in U.S. Pat. No. 3,360,422.

The cellular poly(vinyl chloride) backing may be prepared by any of the well-known methods of preparing poly (vinyl chloride) foams. These are well set forth in the above-mentioned Pat. No. 3,360,422, and the foam used herein is the foam of that patent.

The adhesive film could be any appropriate adhesive film, and the adhesive set forth in Pat. No. 3,360,422 would be particularly suitable in the embodiment of this case.

The strand material is a glass fiber. Other equivalent type yarns could be utilized. The parallel strands are placed in position by the use of conventional feeding structure, such as that shown in U.S. Pat. No. 2,917,421. The important thing is that the glass fibers be placed in the sheet material in the machine direction. Referring to FIG. I, the finished product 8 is shown as moving in a path of movement toward the right. The glass fiber strands will be a parallel arrangement moving in the same direction. Referring to FIG. II, a line perpendicular to the plane of the sheet containing the figure would be extending in the machine direction while a line extending from the right side to the left side of the figure in the plane of the sheet would be across the machine direction. The glass fibers are placed in the flooring at about eight strands per inch of width. The strands are preferably placed into the laminating rolls between the backing and adhesive film, but could be between the adhesive and wear layer.

What is claimed is:
1. A cushion type of floor covering which maintains its dimensional stability and resists delamination comprising:
a flexible wearing surface layer in the form of a sheet of polyvinyl chloride;
a flexible cushion backing layer in the form of a sheet of cellular polyvinyl chloride positioned beneath and substantially coextensive in area with the wearing layer;
an adhesive layer between the two aforementioned layers and adhering together the confronting faces thereof so as to strongly bond the wearing layer and cushion backing together in a manner to resist delamination; and a reinforcing media between the wearing surface and backing layer, said reinforcing media being a plurality of glass fiber strands extending only in the machine direction of the floor covering, which machine direction is the longer dimension of the floor covering, said parallel strands being the only glass fiber reinforcing structure in the flooring so that there is no reinforcing structure extending across the machine direction of the floor covering, whereby there is eliminated the undesirable curl of the floor covering in the across-machine direction.

References Cited

UNITED STATES PATENTS

| 3,172,072 | 3/1965 | Willy | 161—159 X |
| 3,183,996 | 5/1965 | Capaul | 161—141 X |

FOREIGN PATENTS

| 581,239 | 8/1959 | Canada | 161—58 |

WILLIAM A. POWELL, Primary Examiner

U.S. Cl. X.R.

156—179; 161—160